United States Patent [19]

Tsao et al.

[11] Patent Number: 5,453,846
[45] Date of Patent: Sep. 26, 1995

[54] IMAGE CONVERTION METHOD

[75] Inventors: Wan L. Tsao, Willowbrook; John P. Neurauter, Jr., Chicago, both of Ill.

[73] Assignee: Matsushita Graphic Communication Systems, Tokyo, Japan

[21] Appl. No.: 214,009

[22] Filed: Mar. 16, 1994

Related U.S. Application Data

[63] Continuation of Ser. No. 828,718, Jan. 31, 1992, abandoned.

[51] Int. Cl.⁶ .................................................. H04N 1/40
[52] U.S. Cl. .......................... 358/448; 358/445; 358/447; 382/254; 382/298
[58] Field of Search ....................... 358/443, 445, 358/447, 448, 451, 456; 382/47, 54

[56] References Cited

U.S. PATENT DOCUMENTS

| | | | |
|---|---|---|---|
| 4,651,223 | 3/1987 | Sasaki et al. | 358/451 |
| 5,068,905 | 11/1991 | Hackett et al. | 358/451 |
| 5,089,893 | 2/1992 | Iwase | 382/298 |
| 5,299,029 | 3/1994 | Moriya et al. | 358/447 |

*Primary Examiner*—Scott A. Rogers
*Assistant Examiner*—Thomas D. Lee
*Attorney, Agent, or Firm*—Amster, Rothstein & Ebenstein

[57] ABSTRACT

An image conversion method using an algorithm for scaling rasterized images in both the horizontal and vertical direction. Non-integer remainders of multiplication functions are incorporated into the conversion process to provide highly accurate conversion results. The process provides expansion or contraction of the image in a best fit mode in order to provide the ideal amount of scaling to coincide with the physical requirements of the output device. In addition, conversion with maintenance of the aspect ratio of the original image can be effected with highly accurate image reproduction results.

10 Claims, 4 Drawing Sheets

IMAGE CONVERTION METHOD

This is a continuation of Ser. No. 07/828,718 filed Jan. 31, 1992, now abandoned.

BACKGROUND OF THE INVENTION

1. Field of the Invention

The invention relates generally to image transfer between devices. More specifically, a non-destructive method is taught for expanding or contracting images transferred from a first to a second device having incompatible resolution formats.

2. Background of the Invention

Exchange of image data between equipment, input from devices such as scanners, facsimile machines and computers, to output devices such as printers, video monitors, plotting devices or mass storage systems such as floppy discs, fixed discs, CD ROM and the like, is complicated by the inconsistent image proportions of the associated equipment. Expansion or contraction of the image for outputting to a device requires extensive reworking of the image dot/pixel by dot/pixel or data block by data block, in the case of compressed image data. Most known image conversion processes are destructive to the original image in that they randomly discard picture elements (pixels) to obtain the necessary conversion ratio. They generally utilize a multiplication factor, obtained by the ratio of the input to the desired output dimensions, and apply the factor randomly to achieve the desired dimensions. Systems which selectively discard pixels can be equally destructive to the images, though critical information is not usually lost. These commonly used practices result in output of degraded and distorted images. In addition, maintenance of the input aspect ratio, when desired, is virtually impossible utilizing the known image conversion technology. Moreover, the accuracy of past multiplication systems is suspect given the inability of systems to account for fractional remainders of picture elements in a whole integer pixel mosaic, particularly in instances of image reduction.

U.S. Pat. No. 4,628,534 of Marshall, entitled "Method for Changing the Resolution of Compressed Image Data" provides one so-called multiplication method of image conversion. In that method, the compressed image data is multiplied by the ratio of the desired output image size to the original input image size. Fractional "residues" of the multiplication step are rounded up to whole integers if greater than 0.5, or carried as cumulative residue if less than 0.5. Thus, Marshall does attempt to provide additional accuracy by accounting for the fractional residue of the multiplication procedure. The rounding of fractional, or decimal, residue does provide better image reproduction but allows up to 50% error per pixel, which in some applications may be unacceptably high.

It is therefore an objective of the present invention to provide an accurate non-destructive method of image size conversion.

It is a further objective of the invention to provide conversion of an image of one size to another size without distortion or loss of information.

It is yet another objective of the invention to provide an image size conversion method which can be used either to maintain aspect ratio or to convert the dimensions of an image in a non-uniform ratio to the original dimensions.

An additional objective is to provide a more accurate image conversion method which accounts for fractional remainders of picture elements to a higher degree of resolution than previously found in the art.

SUMMARY OF THE INVENTION

These and other objectives are realized in an image conversion method using an algorithm for scaling rasterized images in both the horizontal and vertical directions regardless of resolution. Non-integer remainders of multiplication functions within the algorithm are incorporated into the conversion process to provide highly accurate conversion results. The process provides expansion or contraction of the image in a "best fit method" in order to provide the largest or smallest amount of image scaling to coincide with the physical requirements of the output device without regard for the maintenance of a predetermined aspect ratio, when aspect ratio is not a primary concern. When aspect ratio is to be maintained, the process can be implemented to output highly accurate reproductions of the input image.

BRIEF DESCRIPTION OF THE DRAWING

The invention will now be described in detail with reference to the Figures.

DETAILED DESCRIPTION OF THE INVENTION

Throughout the following descriptions, for the purposes of clarity and consistency, the term "main scan" will refer to operations on the horizontal lines of the images, and the term "sub scan" refers to the vertical lines or columns of the images. The use of the words "main" and "sub" is arbitrary and should not be interpreted as qualitative terms, nor is the order of selected operations invariable, i.e. sub scan operations could precede "main" scan operations. Consistency within a single application of the process steps is all that is required.

In certain application of the inventive method, the maintenance of the image's aspect ratio (relationship between the vertical and the horizontal) will be necessary; as, for example, in the reproduction of a logo. The limiting factors for maintenance of the exact aspect ratio are, of course, the physical limitations of both the input and output devices. The inventive process flow will be described, both in the general description and in the example that follows, for an image conversion operation requiring aspect ratio maintenance. Those features or operations which are not needed for a fill situation, where aspect ratio is not critical, will be noted. The algorithm is, as noted above, useful for both conversion categories.

Figure 1:
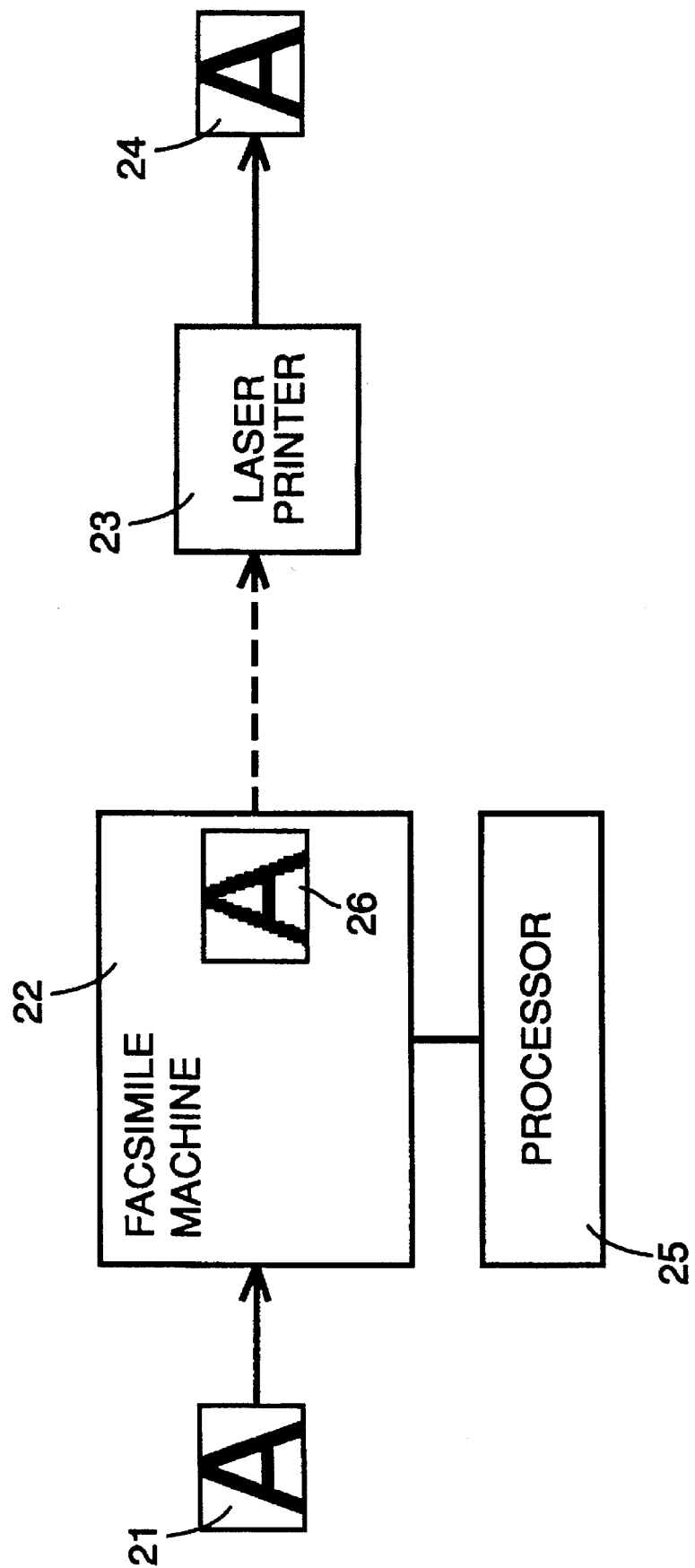
FIG. 1 illustrates a document, input to and rasterized by a facsimile machine and output to a letter size page via a laser printer in accordance with an illustrative embodiment of the invention.

In applying the subject method in an image conversion situation requiring aspect ratio to be maintained, an initial determination is made of the image sizes in order that a best fit method can be applied. As illustrated in FIG. 1, an input document, 21, is to be provided to a facsimile machine, 22, for transmission to a laser printer, 23, which will output a scaled version of the document, 24. A processor, 25, is connected to the facsimile machine, 22. It is to be understood that the scaling method can be implemented by a processor resident in, or associated with, any one of the affiliated image-generating entities. The processor, 25, is illustrated as being associated with the facsimile machine, 22, merely for the sake of clarity and for descriptive purposes, as related to the illustrative embodiment detailed below.

Figure 2:
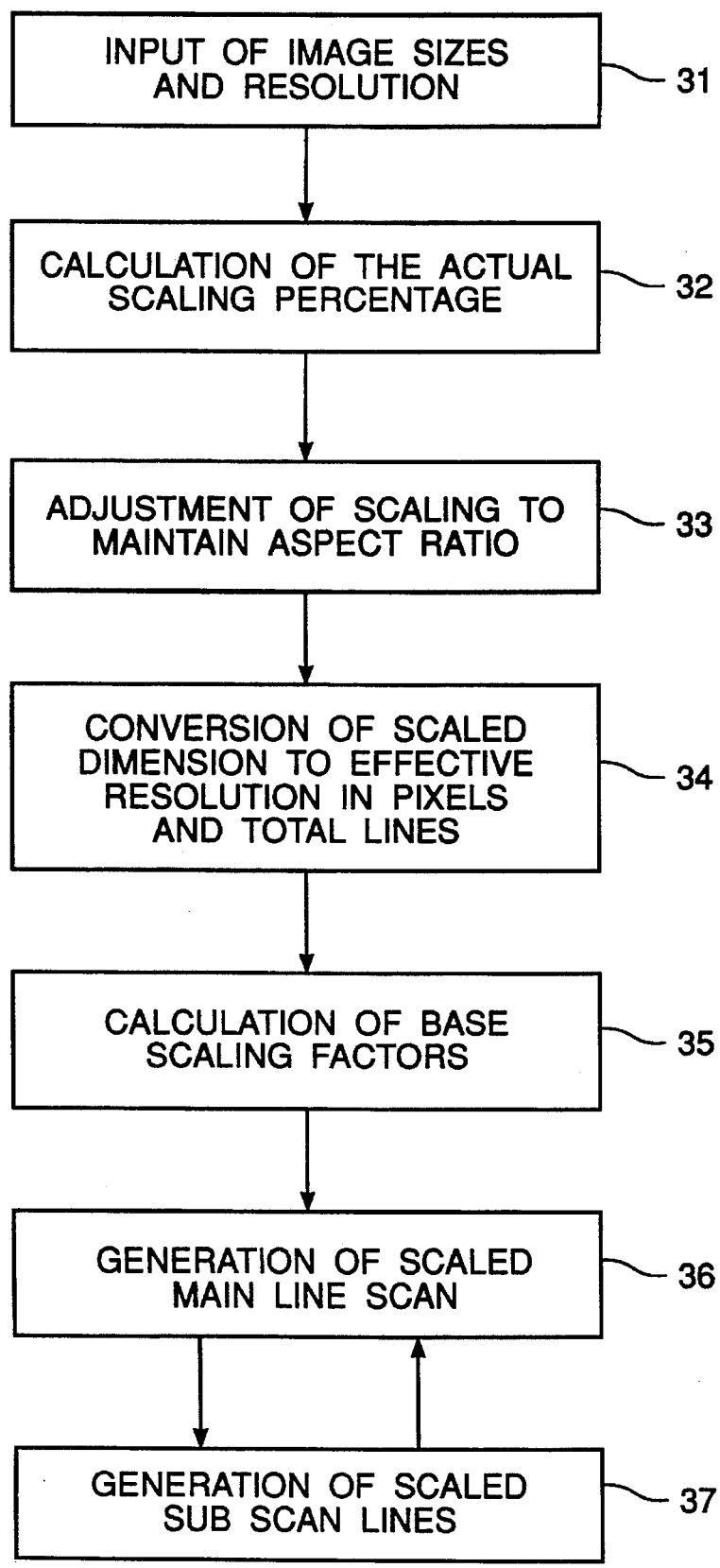
FIG. 2 provides a flow chart of the steps of the process.

The input document, 21, is first scanned to determine the horizontal dimension of the physical image input which is designated as the original main scan. A second scan is made of the vertical dimension of the input image, 21, and is designated the original sub scan. These values are input to the system, as the first step, labelled 31 in FIG. 2, either by a physical scan, measurement by system components, or user input, if applicable. These values can, in dedicated systems, be resident in the system, without the need for scanning or inputting. Also input to the system, again scanned, operator input or resident values, are the horizontal and vertical dimensions of the desired output image, 24, designated the length of the scaled output main scan and the length of the scaled output sub scan, respectively. The effective resolution of the output, 24, is also required by the system. Input of the total pixels and lines per unit dimension are therefore necessary input, once again as measured, user input, or resident values. Consistency of units of dimension is preferable here, e.g. if length and width are given in inches, resolution should be pixels and lines per inch.

A vertical scaling percentage is determined by the relation:

---
LENGTH OF SCALED OUTPUT SUB SCAN/
LENGTH OF ORIGINAL SUB SCAN
=
VERTICAL SCALING PERCENTAGE
--- and, the horizontal scaling percentage is determined by the relation:

---
LENGTH OF SCALED OUTPUT MAIN SCAN/
LENGTH OF ORIGINAL MAIN SCAN
=
HORIZONTAL SCALING PERCENTAGE
---

Since the aspect ratio is to be maintained, for the sake of this description, a single actual scaling percentage must be chosen. It must, of necessity, be the lesser of the determined values in order for both dimensions to fit on the output image. Therefore, in the step labelled 32, the actual scaling percentage is arrived at by choosing the lesser of the vertical or the horizontal scaling percentages.

The Length of the Scaled Main Scan and the Length of the Scaled Sub Scan must now be adjusted so that the Scaled values to be further manipulated will accurately reflect the original aspect ratio which is to be maintained. In step 33, therefore, the adjusted values are arrived at by the following relations:

---
LENGTH OF ORIGINAL MAIN SCAN *
ACTUAL SCALING PERCENTAGE
=
LENGTH OF SCALED MAIN SCAN
---

-continued
---
ADJUSTED FOR ASPECT
and
LENGTH OF ORIGINAL SUB SCAN *
ACTUAL SCALING PERCENTAGE
=
LENGTH OF SCALED SUB SCAN
ADJUSTED FOR ASPECT
---

From the physical dimensions, both horizontal and vertical/main and sub scan, the effective main and sub scan line lengths of the output can now be calculated. The output values are generated in total picture elements (pixels) per main scan line and total lines to be generated as sub scans. This is, in essence, adjusting the physical size to the effective resolution of the output at 34. The output resolution per unit of dimension, in pixels and lines per unit of dimension were originally input information to the system. Application of the resolution values to the scaled and adjusted dimensions is effected by:

---
LENGTH OF SCALED MAIN SCAN
ADJUSTED FOR ASPECT *
RESOLUTION/UNIT OF DIMENION
=
SCALED OUTPUT MAIN SCAN RESOLUTION IN PIXELS
and
LENGTH OF SCALED SUB SCAN
ADJUSTED FOR ASPECT *
LINES/UNIT OF DIMESION
=
TOTAL SUB SCAN LINES FOR THE OUTPUT
SCALED IMAGE
---

From this point forward in the discussion, the steps are identical for the image conversion with aspect ratio intact or the fill situation wherein aspect ratio is to be disregarded.

Base scaling factors for main and sub scans are calculated, at 35, resulting in two sets of decimal numbers. This is done by dividing the scaled resolution image output values by the original resolution image input values. When maintaining the aspect ratio, the scaled values used are the scaled output values arrived upon in the calculation immediately preceding. For a fill situation, the scaled values are the resolution values in pixels and lines of the desired output image as originally input to the system. The calculation is:

---
SCALED OUTPUT MAIN SCAN RESOLUTION
IN PIXELS/
ORIGINAL MAIN SCAN RESOLUTIO IN PIXELS
=
MAIN SCAN BASE SCALING FACTOR WITH
TWO DECIMAL PLACES
and
TOTAL SUB SCAN LINES FOR THE
OUTPUT SCALED IMAGE/
ORIGINAL SUB SCAN LENGTH IN LINES
=
SUB SCAN BASE SCALING FACTOR
WITH TWO DECIMAL PLACES
---

The main and sub scan scaling factors will be decimal numbers. If the raster image is to be scaled up to a larger size or increased resolution, these numbers will be greater than 1.00. Likewise, if the image is to be scaled down, these numbers will be less than 1.00.

The base scaling factors can now be applied to the original image data.

Figure 3:
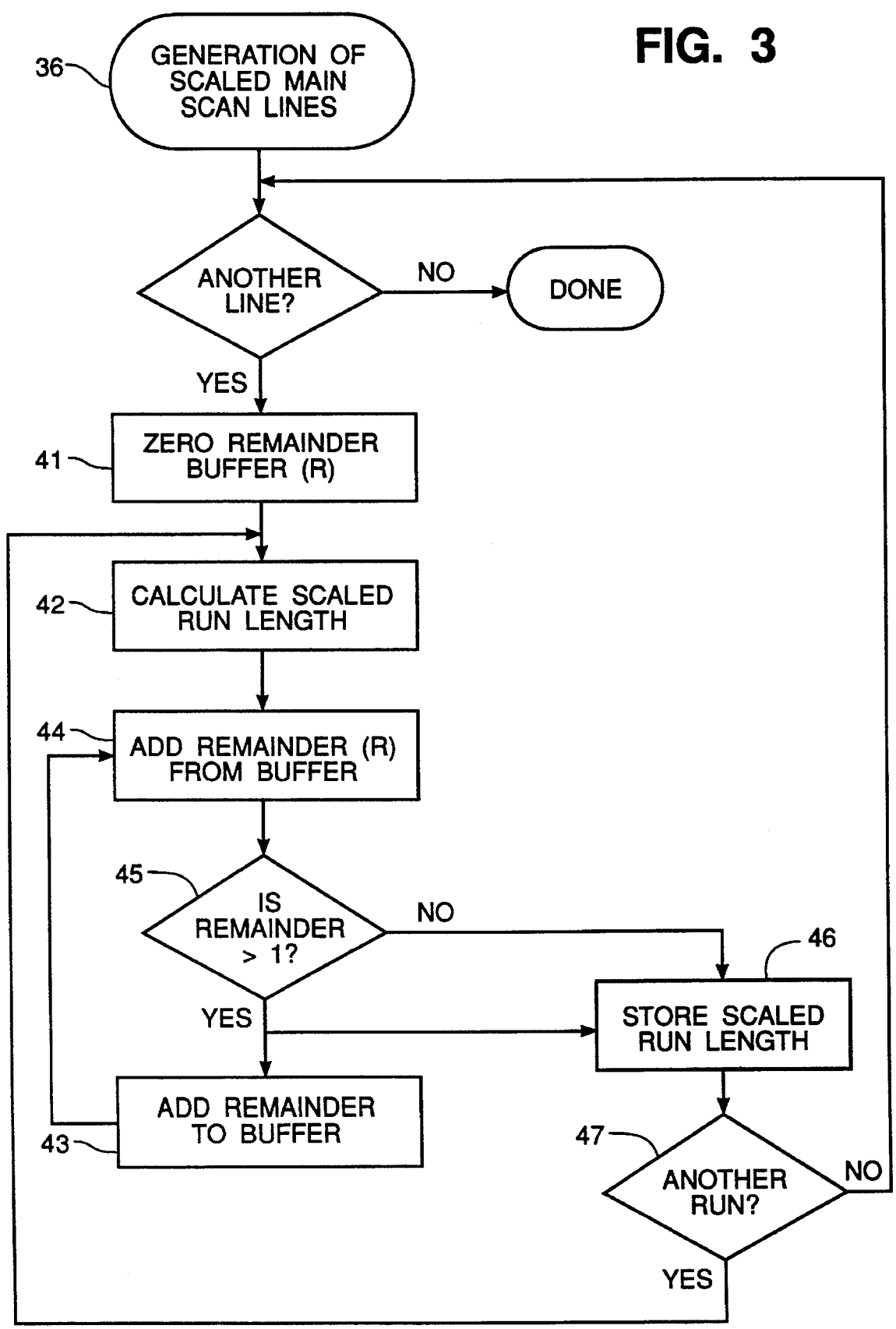
FIG. 3 illustrates the flow of the Scaled Main Scan Line Generation.

For main scan scaling, the method is most effective when applied to image data which is encoded or compressed, by any one of many coding schemes, into data runs. A data run, by well-known definition, is a series of identical pixels. The data run length is a value that represents the numerical expression for the length of a run of identical pixels (e.g. 1's or 0's). As each data run length in a line is processed (i.e. scaled), at 42, there will generally be an integer and a non-integer value generated by the decimal factor in the multiplier. The run length is calculated, at 42, by multiplying it by the Main Scan Line Base Scaling Factor. Any remainder in the buffer is added to the run length value, at 44. The whole integer is stored as the scaled run length, at 46. The non-integer value or remainder, if any at 45, is placed in a remainder buffer at the end of each data run, at 43. The remainders carry forward and may overlap, generating whole integer increments when added to each scaled data run length pixel count, at 44. At the end of each line processed however, the remainders buffer must be reset to zero, at 41. In fact, proper programming technique will dictate that the buffer be cleared and reset at the beginning of each line. The scaled main scan line is generated, at 36 and further detailed in FIG. 3, as follows:

---

(ORIGINAL MAIN SCAN DATA RUN
LENGTH IN PIXELS
*
MAIN SCAN BASE SCALING FACTOR)
+
VALUE OF REMAINDER BUFFER
=
SCALED DATA RUN LENGTH IN PIXELS
AND
RECALCULATED VALUE OF REMAINDER BUFFER

---

This calculation will be made in a simple loop, repeating steps, at 47, for each run until one main scan line has been processed and stored, at 46, in memory.

At the beginning of each scaling process, the value generated as the Sub Scan Base Scaling Factor will be loaded into a memory buffer. This value, in the case of scaling down an image or reducing resolution will be less than 1.00. When the value is less than one, the result is no output of a line to the output device and the main scan line as generated above is disregarded. The value in the buffer is incremented for that line, however, with the addition at 53, of FIG. 4, of the value of the sub scan base scaling factor, 52. A simple loop is utilized until the value in the buffer becomes equal to or greater than one, at 54. The integer value is provided for generation of the output line, at 55. If there is a non-integer remainder, at 56, it is added, at 57, to the remainder buffer.

In the case of a scaled-up or increased resolution conversion, the value of the sub scan base scaling factor will be greater than 1.00 and processed as follows:

---

VALUE OF SUB SCAN REMAINDER BUFFER
+
VALUE OF SUB SCAN BASE SCALING FACTOR
=
NUMBER OF TIMES TO
OUTPUT MAIN SCAN LINE DATA
AND
NEW VALUE OF SUB SCAN REMAINDER VALUE

---

Figure 4:
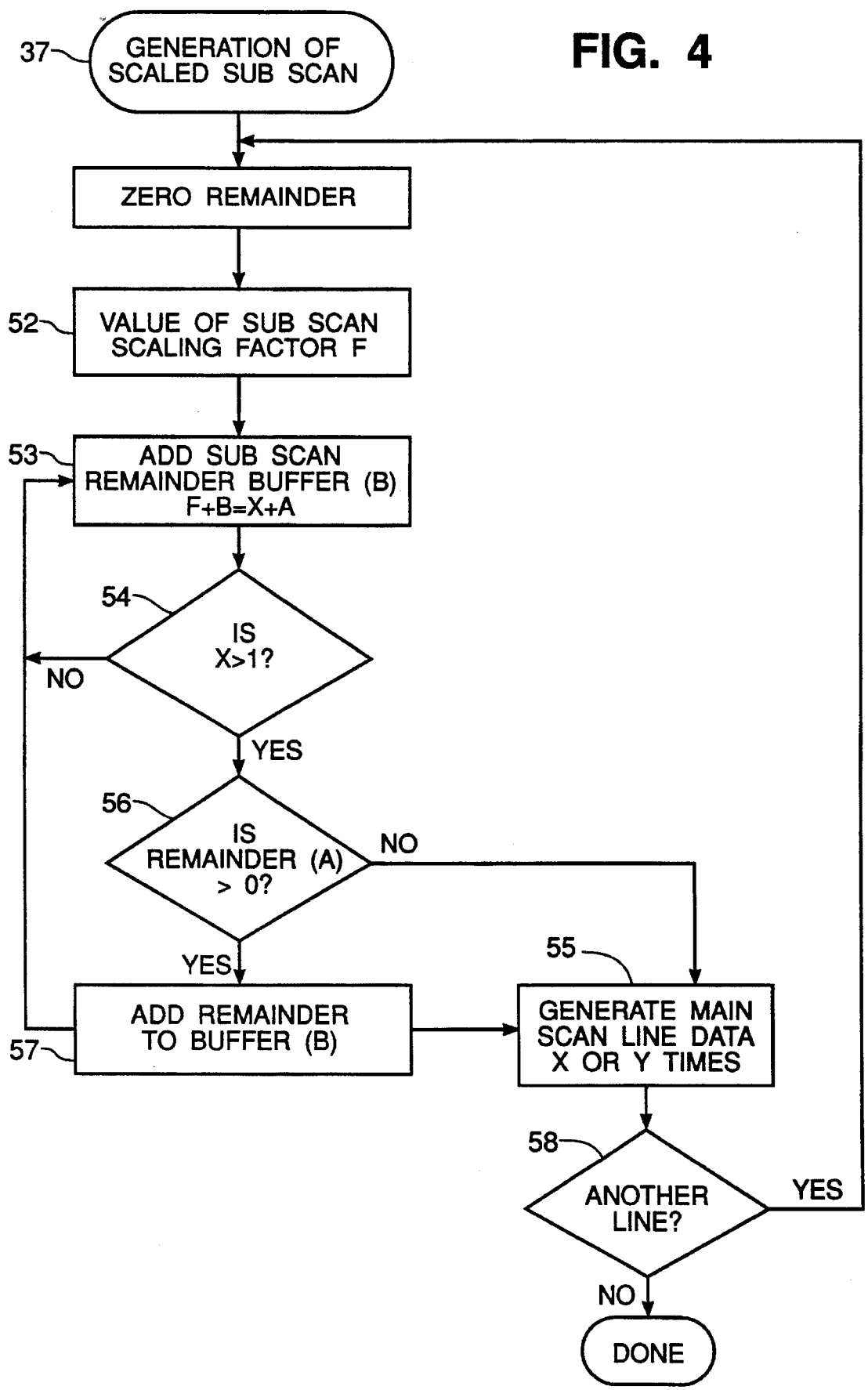
FIG. 4 illustrates the flow of the scaled Sub Scan, or Number of Line, Generation.

After the determination of whether a main scan line is generated and, if so, how many times it is to be outputted to the device, in FIG. 4, the next main scan line, 58, is processed until either the entire image has been scaled or a predetermined point has been reached.

The process may be summarized as the following steps:

---

| | |
|---|---|
| STEP 1: | Input of original image size |
| | Input of output image size |
| | Input of output image resolution (in pixels and line) |
| STEP 2: | Calculation of Actual Scaling Percentage |
| STEP 3: | Adjustment of Scaling to Maintain Aspect Ratio |
| STEP 4: | Conversion of Scaled Physical Dimensions To Effective Resolution In Pixels And Total Lines |
| STEP 5 | Calculation of Base Scaling Factors |
| STEP 6 | Generation of Scaled Main Scan Line |
| STEP 7 | Generation of Scaled Scan Lines |

---

As noted above, steps 2–4 apply only to a conversion wherein the original aspect ratio can be disregarded. Steps 6 and 7 occur virtually simultaneously and necessarily involve outputting to the output device.

The following description, with reference to FIG. 1, is an example of the inventive method applied between a standard facsimile input, 21, and a laser printer output, 24. Although the "physical input" is to be reduced, the actual "original input" is the raster image, 26 resident in the facsimile machine, which is to be enlarged. The aspect ratio of the physical input is to be maintained, therefore steps 2–4 are included and require details of the dimensions of the physical input.

The following example provides conversion from a standard facsimile machine to a laser printer using the steps of the present invention. For purposes of the example, aspect ratio is to be maintained.

STEP 1 (31 at FIG. 2):
  Input from Standard facsimile mode:
  Physical image, 21, input size:
    8.5" horizontal width
    11.0" vertical height
  Raster image, 26, input size:
    1728 pixels per line
    1078 lines per page
  Output to laser printer engine (typical effective printing area):
    Actual Printable area on 24:
      8.0" horizontal width
      10.6" vertical height
    Actual printable area in pixels @ 300 dpi:
      2400 pixels per line
      3180 lines per page
STEP 2 (32 on FIG. 2):
  Calculate Initial Determination to Maintain Aspect Ratio:
  DIMENSIONAL WIDTH:
    8.0"/8.5"=94% of image dimensional width
  DIMENSIONAL HEIGHT:
    10.6"/11.0"=96% of image dimensional height

ACTUAL SCALING PERCENTAGE: 94%

STEP 3 (33 on FIG. 2):
  Adjustment of scaling to maintain aspect ratio:
  Main scan line:
    8.5"×94%=7.99"
  Sub scan line:
    11.0"×94%=10.34"

STEP 4 (34 on FIG. 2):
  Adjust physical size to effective resolution:
  Main scan line:
  7.99"×300 pixels per inch=2397 pixels
  Sub scan line:
  10.34"×300 lines per inch=3102 lines per page
STEP 5 (35 on FIG. 2):
  Calculation of base scaling factor:
  Main Scan:
  2397 pixels/1728 pixels=1 remainder 38
  Adjust Main Scan base scaling factor to Remainder:
  1728*1.38=2384 pixels
  Sub Scan:
  3102 lines/1078 lines=2 remainder 88
STEP 6 (36 on FIG. 2 and detailed in FIG. 3):
  GENERATION OF A SCALED LINE OF RASTER DATA:
  At the beginning of each scan line scaled, a Remainder Buffer is set to 00.
  The following is a representation of one line consisting of ten run lengths of white and black data.

| BLOCK | VALUE | LENGTH |
|---|---|---|
| 0 | 1 | 100 pixels |
| 1 | 0 | 300 pixels |
| 2 | 1 | 144 pixels |
| 3 | 0 | 184 pixels |
| 4 | 1 | 400 pixels |
| 5 | 0 | 33 pixels |
| 6 | 1 | 97 pixels |
| 7 | 0 | 70 pixels |
| 8 | 1 | 200 pixels |
| 9 | 0 | 200 pixels |

Calculations:

Remainder buffer: 00
Block 0
  (100 pixels * 1 remainder 38) + 00 = 138 pixels remainder 00
Remainder buffer: 00
Block 1
  (300 pixels * 1 remainder 38) + 00 = 414 pixels remainder 00
Remainder buffer = 00
Block 2
  (144 pixels * 1 remainder 38) + 00 = 198 pixels remainder 72
Remainder buffer = 72
Block 3
  (184 pixels * 1 remainder 38) + 72 = 254 pixels remainder 64
Remainder Buffer = 64
Block 4
  (400 pixels * 1 remainder 38) + 64 = 552 pixels remainder 64
Remainder Buffer = 64
Block 5
  (33 pixels * 1 remainder 38) + 64 = 46 pixels remainder 18
Remainder buffer = 18
Block 6
  (97 pixels * 1 remainder 38) + 18 = 134 pixels remainder 04
Remainder buffer = 04
Block 7
  (70 pixels * 1 remainder 38) + 04 = 96 pixels remainder 64
Remainder buffer = 64
Block 8
  (200 pixels * 1 remainder 38) + 64 = 276 pixels remainder 64
Remainder buffer = 64
Block 9
  (200 pixels * 1 remainder 38) + 64 = 276 pixels remainder 64
Total number of pixels generated for this line = 2384

STEP 7 (37 on FIG. 2 and detailed in FIG. 4):
  GENERATION OF SUB SCAN LINES

After storing the above calculated Main Scan Line to the line buffer, the number of sub scan lines is to be determined and outputted to the device.

In the case of a reduced size image, where the Sub scan factor is less than 1.00, it is advantageous to check the value of the remainder plus the value of the Sub scan Scaling Factor to determine if it is necessary to calculate the Main Scan for that particular line.

In this example, the Sub scan Factor is 2 remainder 88, therefore the first line generated above would be outputted 2 times to the device with the Remainder of 88 carried forward for the next line calculated.

After the generation of the two lines as above, the program would then generate the next Main Scan Line and repeat this loop as long as data is available.

The second Main Scan Line would be outputted to the device as follows:

Remainder 88+2 Remainder 88= 3 Remainder 76

The second line would be outputted 3 times and the Remainder of 76 carried forward in the register for the next line.

The Remainder buffer or register is only cleared or forced to return to 00 at the completion of the conversion.

While the invention has been described with reference to a specific embodiment, it will be understood by those skilled in the art that modifications may be made without departing from the spirit and scope of the invention.

What is claimed is:

1. A method for converting an original image of an original size to a scaled image of the original image having dimensional differences from said original image, the scaled image being of a scaled size having scaled horizontal and vertical dimensions and resolution in pixels per unit of dimension and said original image being of original size having original horizontal and vertical dimensions and resolution in pixels per unit of dimension, comprising the steps of:

a. storing said original image in a storage medium as a plurality of sequential lengths of data runs of pixels;

b. setting a cumulative remainder value at zero in a buffer;

c. determining a base scaling factor by dividing said scaled resolution of said desired image in pixels per unit of dimension by said original resolution of the original image in pixels per unit of dimension;

d. retrieving from the storage medium a first sequential data run of pixels representing a length of the original image data;

e. multiplying said retrieved first sequential data run representing a length of original image data by said base scaling factor to produce a first length of scaled image information represented by a whole integer and an incomplete length of scaled image information represented by a decimal value;

f. storing in said storage medium said first whole integer representing said first length of scaled image information in pixels and adding said first decimal value representing said incomplete length of scaled image information to said cumulative remainder value in said buffer;

g. retrieving from said storage medium a next data run length representing another length of original image data;

h. multiplying said next retrieved original data run length representing another length of original image data by said base scaling factor and adding said cumulative remainder value, wherein the result is a next length of scaled image information represented by a next whole integer and a next incomplete length of scaled image information represented by a next decimal value;

i. storing said next whole integer representing a length of scaled image information in pixels as the scaled data run length and storing said second decimal value representing said incomplete length of scaled image information as said cumulative remainder in said buffer; and h. repeating steps d through i for each original data run length stored in said storage medium until all of said plurality of data runs of said original image have been scaled to produce in said storage medium a stored scaled representation of the original image scaled in horizontal and vertical dimensions and resolution in pixels per unit of dimension.

2. A method for vertically scaling an original image to produce a vertically scaled image having scaled vertical and horizontal lengths and a resolution in pixels per unit length based upon said original image having original horizontal and vertical lengths and an original number of original lines, said original image being stored in a storage medium as a plurality of lines of pixels, comprising:

a. determining a scaled number of lines of pixels for said scale image;

b. calculating a base scaling factor by dividing the scaled number of lines of pixels by said original number of original lines of pixels;

c. setting a cumulative line remainder value in a buffer at zero;

d. retrieving from said storage medium a line of original data;

e. adding said base scaling factor to said cumulative line remainder value to arrive at a whole line output integer and a sub-line decimal value;

f. storing said sub-line decimal value as said cumulative line remainder value;

g. outputting a number of said whole lines of pixel data dependent upon said whole line output integer; and h. repeating steps d through g until said plurality of original lines of data has been vertically scaled.

3. The method of claim 2 wherein, said determining of scaled number of lines comprises:

a. multiplying said scaled resolution in pixels per unit length times said original vertical length.

4. The method of claim 2 wherein said determining a scaled number of lines comprises the steps of:

a. obtaining an actual scaling percentage by calculating a vertical scaling percentage by dividing the vertical length of the desired scaled image by the original vertical length of the original image;

b. providing the scaled vertical length of said scaled image by multiplying the original vertical length by the actual scaling percentage; and c. determining the scaled number of lines by multiplying the scaled length of said scaled image by the scaled resolution per unit of dimension.

5. The method of claim 4, wherein said obtaining of said actual scaling percentage comprises:

a. calculating said vertical scaling percentage;

b. calculating an horizontal scaling percentage by dividing said horizontal length of said scaled image by the horizontal length of the original image; and c. selecting the lesser of the horizontal and vertical scaling percentages.

6. A method for converting an original image of an original size to a scaled image of the original image having dimensional differences from said original image, the scaled image being of a scaled size having scaled horizontal and vertical dimensions and said original image being of original size and having original horizontal and vertical dimensions and resolution in pixels per unit of dimension comprising the steps of:

a. storing said original image in a storage medium as a plurality of sequential lengths of data runs of pixels;

b. setting a cumulative remainder value at zero in a buffer;

c. determining the resolution of said scaled image in pixels per unit of dimension;

d. determining a base scaling factor by dividing said scaled resolution of said desired image in pixels per unit of dimension by said original resolution of the original image in pixels per unit of dimension;

e. retrieving from the storage medium a first sequential data run of pixels representing a length of the original image data;

f. multiplying said retrieved first sequential data run representing a length of original image data by said base scaling factor to produce a first length of scaled image information represented by a whole integer and an incomplete length of scaled image information represented by a decimal value;

g. storing in said storage medium said first whole integer representing said first length of scaled image information in pixels and adding said first decimal value representing said incomplete length of scaled image information to said cumulative remainder value in said buffer;

h. retrieving from said storage medium a next data run length representing another length of original image data;

i. multiplying said next retrieved original data run length representing another length of original image data by said base scaling factor and adding said cumulative remainder value, wherein the result is a next length of scaled image information represented by a next whole integer and a next incomplete length of scaled image information represented by a next decimal value;

j. storing said next whole integer representing a length of scaled image information in pixels as the scaled data run length and storing said second decimal value representing said incomplete length of scaled image information as said cumulative remainder in said buffer; and k. repeating steps e through j for each original data run length stored in said storage medium until all of said plurality of data runs of said original image have been scaled to produce in said storage medium a representation of the original image stored in said storage medium which representation is scaled in horizontal and vertical dimensions and resolution in pixels per unit of dimension.

7. The method of claim 6, wherein said determining of the resolution of said scaled image by multiplying the resolution in pixels per unit of dimension for the original image times the horizontal dimension of said scaled image.

8. The method of claim 7, wherein said determining of the resolution of said scaled image further comprises the steps of:

a. obtaining an actual scaling percentage;

b. determining the output dimension of said scaled image by multiplying the dimension of the original image by said actual scaling percentage; and c. dividing said output dimension of said scaled image by said input resolution of said original image in pixels per line.

9. The method of claim 7, wherein obtaining of said actual scaling percentage comprises:

a. calculating the horizontal scaling percentage by dividing the horizontal dimension of said scaled image by the horizontal dimension of said original image;

b. calculating a vertical scaling percentage by dividing said vertical dimension of said scaled image by said vertical dimension of said original image; and c. selecting the lesser of the horizontal and vertical scaling percentages as the actual scaling percentage.

10. A facsimile machine adapted to convert an original image of an original size to a scaled image of the original image, said scaled image having dimensional differences from said original image, the scaled image being of a scaled size having scaled horizontal and vertical dimensions and said original image being of original size having original horizontal and vertical dimensions and resolution in pixels per unit of dimension, comprising:

a. first storage means for storing said original image as a plurality of sequential lengths of data runs of pixels;

b. means adapted to determine the resolution of said desired scaled image in pixels per unit of dimension;

c. buffer means for temporary storage of cumulative remainder values;

d. retrieval means for retrieving sequential data runs representing sequential lengths of said original image data from said storage means;

e. processor means for determining a base scaling factor by dividing said scaled resolution of said desired image in pixels per unit of dimension by said original resolution of the original image in pixels per unit of dimension, and for multiplying said retrieved sequential data run by said base scaling factor and adding said cumulative remainder values from said buffer means to produce complete lengths of scaled image information represented by whole integers and incomplete lengths of scaled image information represented by decimal values, said decimal values stored as said cumulative remainder in said buffer;

f. second storage means for storing said whole integers representing said lengths of scaled image information in pixels; and g. output means for outputting said lengths of scaled image information.

* * * * *